United States Patent [19]

Taylor

[11] Patent Number: 4,683,673

[45] Date of Patent: Aug. 4, 1987

[54] APPARATUS FOR DESTROYING FIRE ANTS

[76] Inventor: Adoyal Taylor, Rte. 2, Box 113, Fulton, Miss. 38843

[21] Appl. No.: 883,322

[22] Filed: Jul. 8, 1986

[51] Int. Cl.$^4$ ............................................. A01M 1/06
[52] U.S. Cl. .................................................... 43/139
[58] Field of Search ............................. 43/139; 171/9

[56] References Cited

U.S. PATENT DOCUMENTS

| | | | |
|---|---|---|---|
| 1,088,361 | 2/1914 | Pearce | 43/139 |
| 1,495,098 | 5/1924 | Nelson | 43/139 |
| 2,569,722 | 10/1951 | Knox | 43/139 |
| 3,443,885 | 5/1969 | Scholtus | 43/130 |
| 3,750,327 | 8/1973 | Thybault | 43/139 |
| 4,141,174 | 2/1979 | Smith | 43/139 |
| 4,494,611 | 1/1985 | Alvarez | 171/9 |

*Primary Examiner*—M. Jordan
*Attorney, Agent, or Firm*—Robert J. Veal

[57] ABSTRACT

An apparatus for eliminating fire ants in mounds utilizes a high capacity fan to set up a confined airflow adjacent a fire ant mound such that a substantial portion of the mound and its contents are entrained by the airflow. The mound and ants therein are carried by the airflow within the apparatus wherein they are pulverized either by the action of the fan or by a separate mechanical pulverizer into which the mound and ants are deposited from the airflow. The apparatus is designed as an accessory to a tractor or the like and may be powered from the power take-off unit of a tractor.

9 Claims, 5 Drawing Figures

APPARATUS FOR DESTROYING FIRE ANTS

FIELD OF THE INVENTION

The present invention relates to control of ant infestation and particularly to the control of a particular ant generally known as fire ants. More particularly the present invention relates to a mechanical apparatus for removing sufficient quantities of soil from the mound or bed of such fire ants to include the Queen and thereafter pulverizing the soil and its contents.

BACKGROUND OF THE INVENTION

The tropical ants of the genus Solenopsis, especially *S. geminata* and *S. Saevissimo*, prevalent in the southern United States and tropical America are commonly known as fire ants. Fire ants build conspicuous mounds and are capable of inflicting a painful sting which when repeated by a number of ants can be fatal to livestock and other small animals. Fire ants proliferate rapidly and can build large colonies of mounds. This proliferation has rendered considerable pasturage unusable across the southern United States. The fire ant appears to be reasonably climatically adaptable and the genus is gradually extending its geographic range. The spread of fire ant infestation is of considerable concern to agricultural interests. Heretofore, fire ants have been somewhat controlled using commercial pesticides such as the one sold under the trade name, Mirex; however, the majority of, if not all of, the most effective chemical treatments for fire ants post significant toxic hazards to humans and livestock. Consequently, such products are not generally available to control fire ants.

SUMMARY OF THE INVENTION

It is the object of the present invention to provide a non-toxic means for controlling fire ants by destroying the egg bearing queen ant in each localized infestation.

Previous chemical treatments realized that the lives of worker ants were relatively short when compared to the egg bearing queen who may continue to reproduce for several years after mating. Thus, poisoning of the queen has been used to control fire ants. The same theory of control is applied by the instant invention, however, instead of poisoning the queen the present invention is designed to pulverize the mound containing the queen, the unhatched larvae, and the contents of the surface soil proximal the mound. One embodiment of the present invention includes a means to disrupt the mound and adjacent soil when necessary due to substantial vegetation around the mound, however as is well known, the ants will move the queen rapidly away from danger when the mound is disrupted, therefore the invention includes fan means for entraining the mound and its contents in an air flow through a conduit. Thus the mound is physically destroyed and suctioned off the ground. A separator unit removes most of the disrupted mound and its contents from the airflow upstream from the fan means. A rotary valve is used to pass the disrupted material from the separator to a hammermill wherein the mound and contents, including the queen, are pulverized. Since the worker ants cannot reproduce, the ant colony soon dies.

BRIEF DESCRIPTION OF THE DRAWINGS

Apparatus embodying features of my invention are depicted in the accompanying drawings which form a portion of this application and wherein.

DESCRIPTION OF A PREFERRED EMBODIMENT

Figure 1:
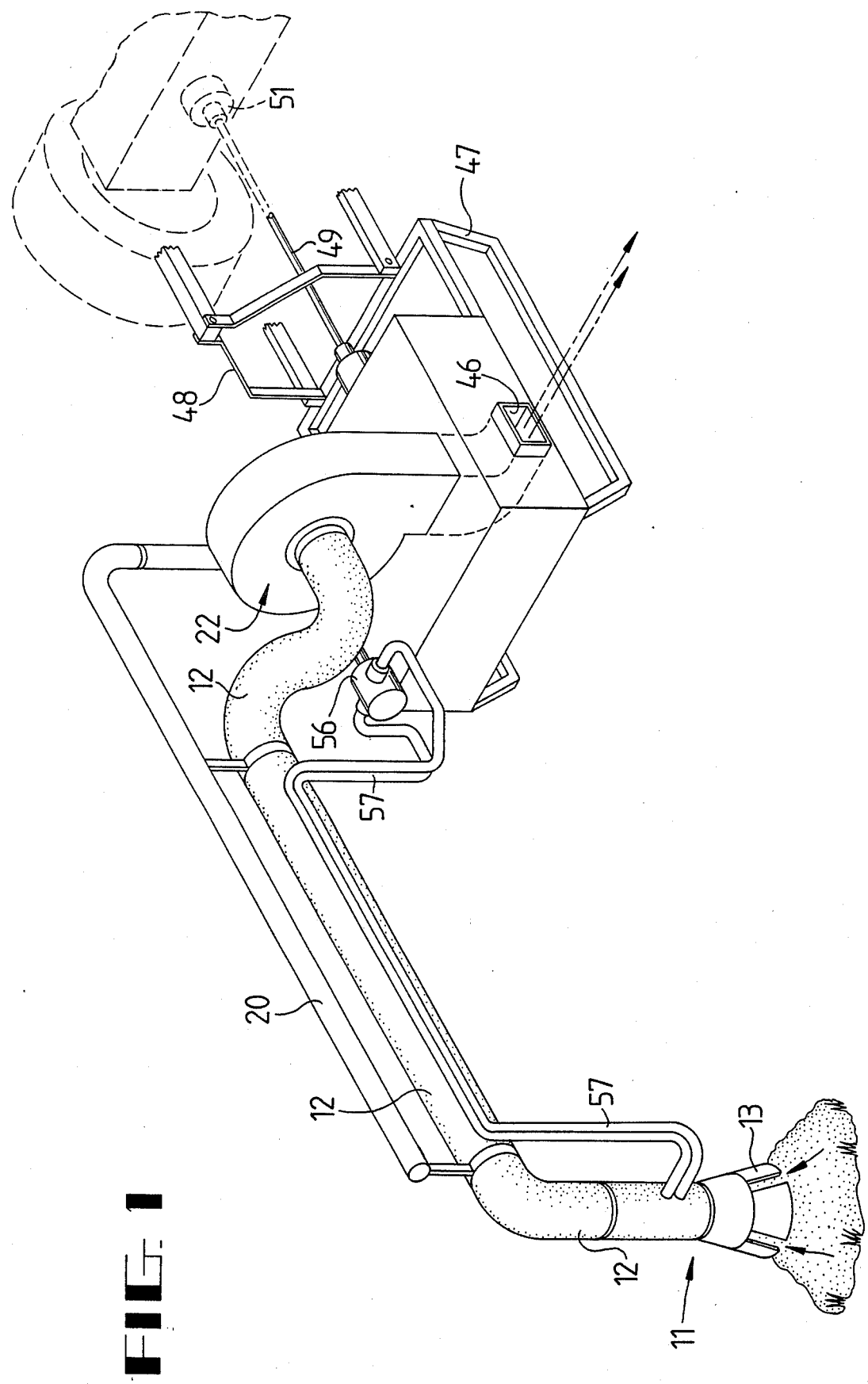
FIG. 1 is a pictoral view of my apparatus as used to eradicate ants.
Figure 2:
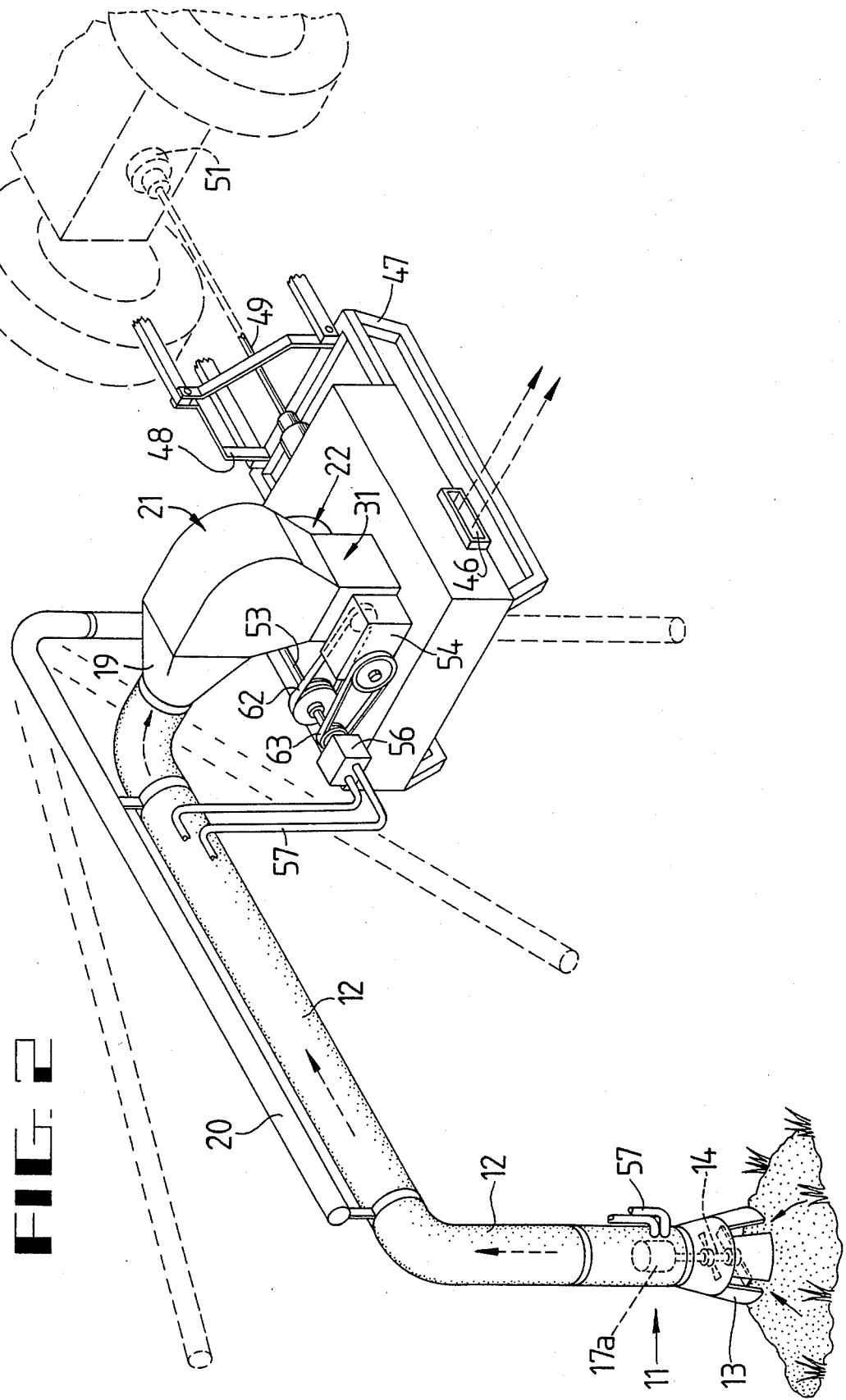
FIG. 2 is a pictoral view of a second embodiment of my invention.
Figure 4:
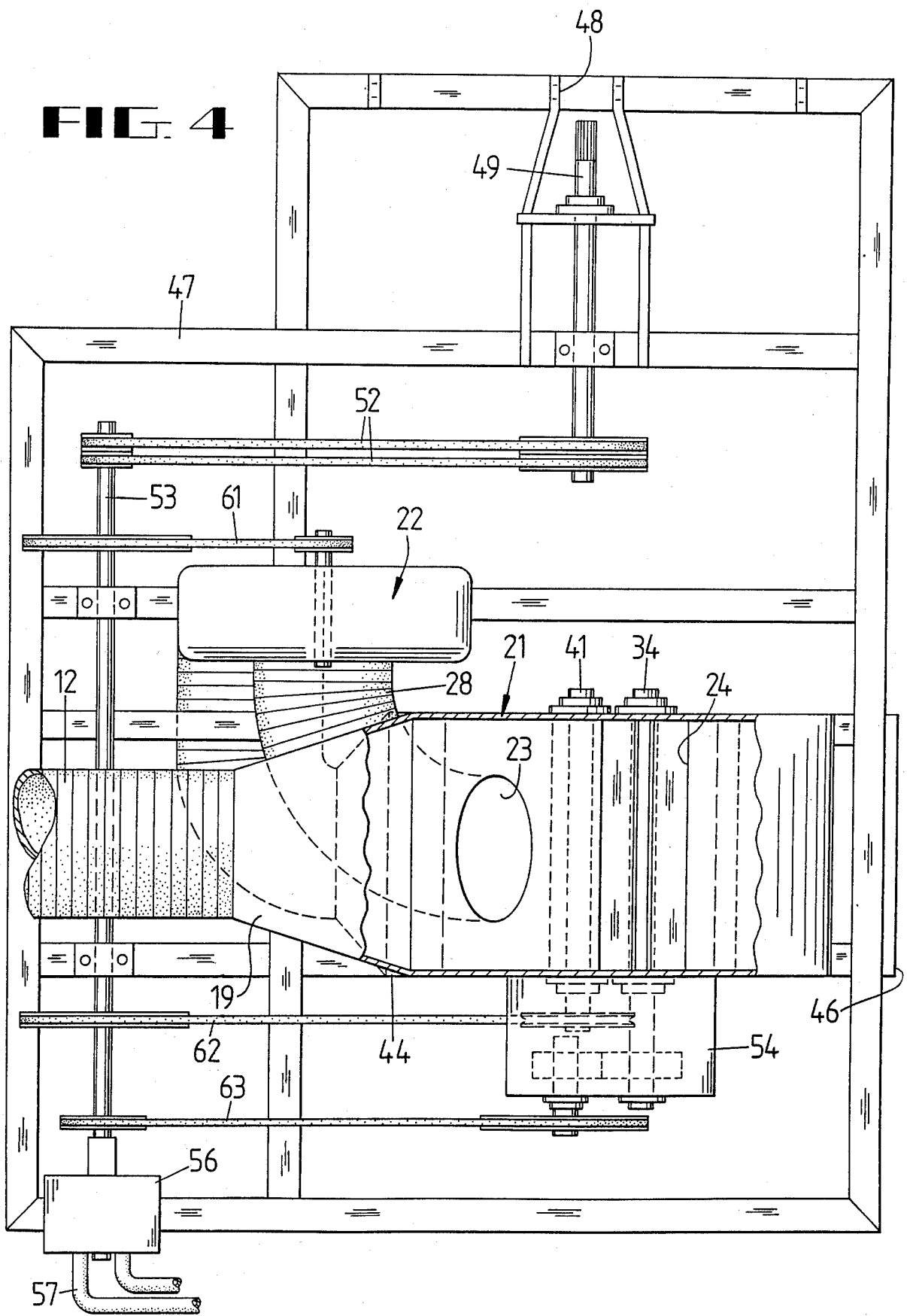
FIG. 4 is a plan view.
Figure 5:
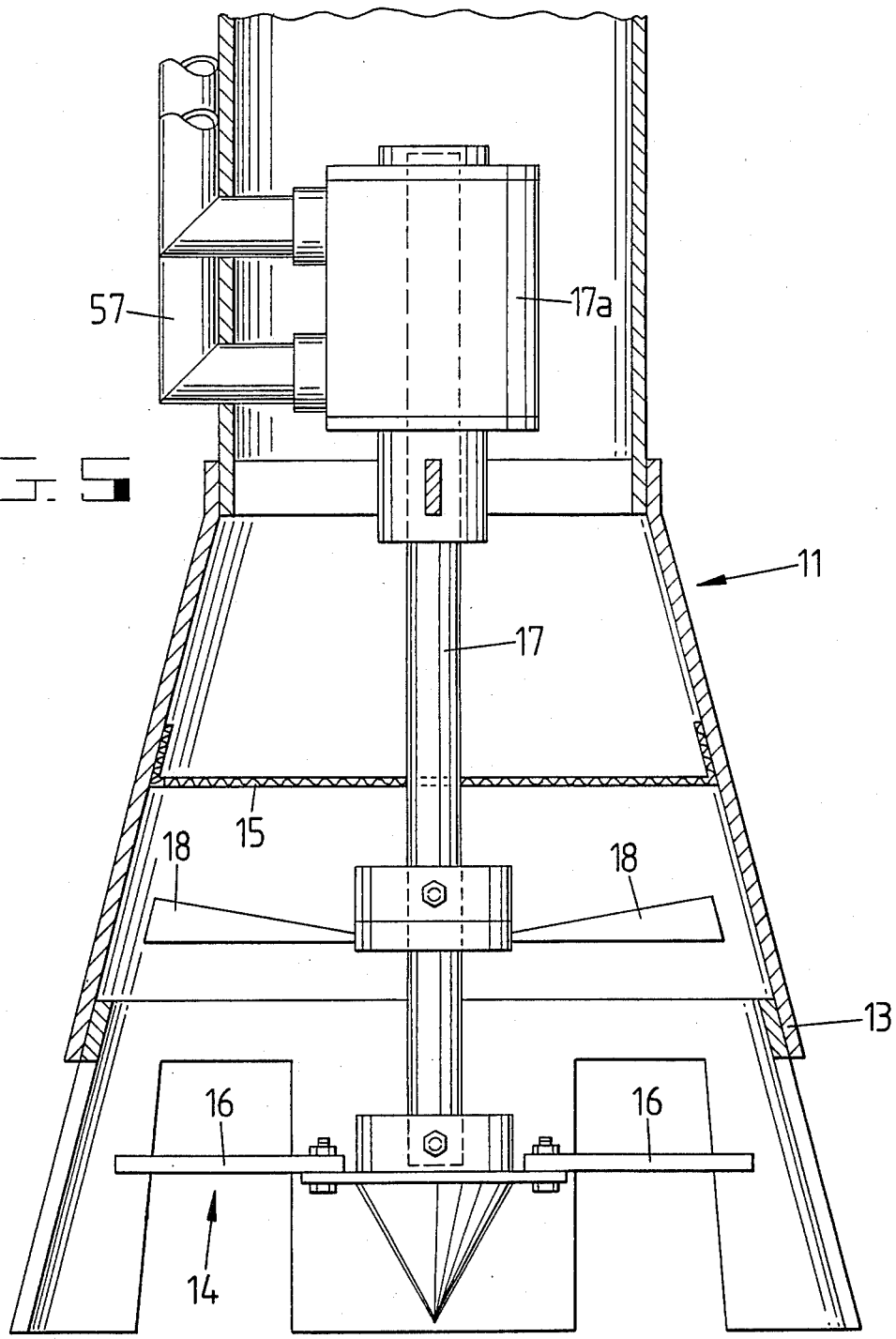
FIG. 5 is a side elevational view partially in section of the pickup element of my apparatus.

Referring to FIGS. 1 and 2, my invention may be seen as a portable apparatus for destroying ant beds. The embodiment shown in FIG. 1 utilizes a movable pick-up unit 11, which is attached to a length of flexible tubing 12. The pick-up unit 11 is essentially an open ended metallic housing 13, which contains a disrupter unit 14 as shown more clearly in FIGS. 2 and 4 and as described hereinafter more fully. The tubing 12 and housing 13 are supported by a movable boom 20 which is adapted to be positioned laterally and vertically through the use of hydraulic actuators as is well known in the art. For example, the boom 20 may be powered by an external hydraulic unit such as may be commonly found on tractors and the like and which can be controlled from the tractor. Attached to the opposite end of the tubing 12 is a fan 22 which induces sub-atmospheric pressure within the housing 13 to set up an airflow from externally of the housing 13, through the tubing and through the fan 22. In this embodiment, the fire ant mound and its contents are entrained in the airflow through the tubing 13 and fan 22 such that any fire ants or eggs thereof are destroyed as they pass through the fan. It will be noted that a screen 15 is included within the housing 13 to prevent large objects such as sticks or roots from being drawn into the fan 22, thus improving the longevity of the fan 22.

Figure 3:
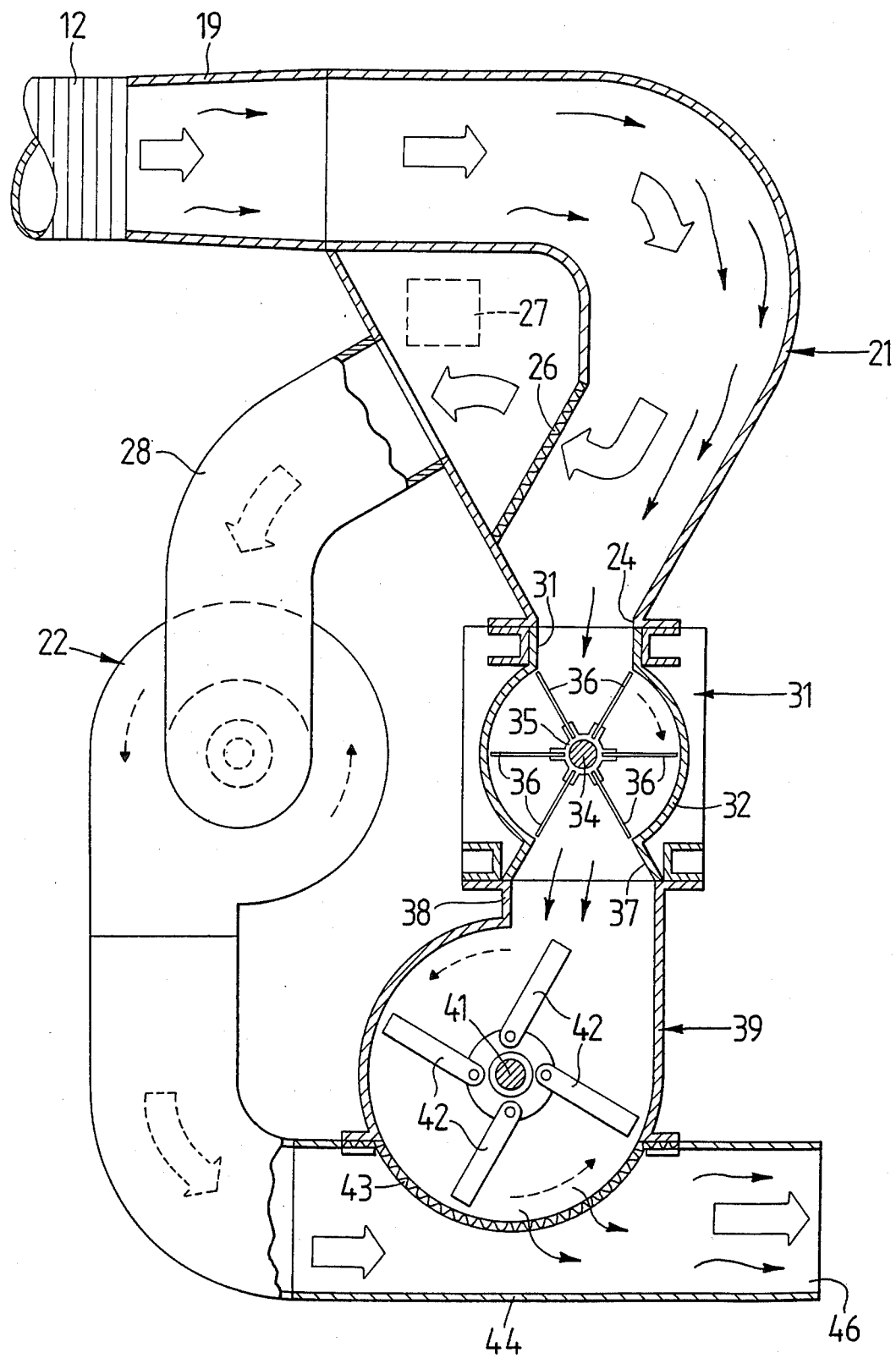
FIG. 3 is a partial side elevational view partially in section.

In FIGS. 2 and 3, I show an embodiment of my invention which further improves the longevity of the fan 22 by separating the debris from the airflow and then pulverizing the debris without passing it through the fan. In this embodiment I utilize a movable pick-up unit 11, attached to a length of flexible tubing 12, and an open-ended metallic housing 13. Within the housing 13 is a disrupter unit 14 which may be a plurality of knife blades 16 mounted on an axially aligned shaft 17 near the open end of housing 13. The shaft 17 may also carry a plurality of fan blades 18 above the knife blades 16. The shaft 17 is rotated by a motor 17a which may be a hydraulic motor or any other suitable means for rotating shaft 17 while maintaining the portable nature of the tubing 12. It should also be noted that the tubing 12 is reinforced to resist collapse due to a differential in pressure and that the housing 13 also includes the large mesh screen 15 to prevent passage of rock and sticks therethrough.

The tubing 12 is connected distal the housing 13 to the intake port 19 of a separator unit 21 which in turn is connected to the intake of the high volume fan 22. Preferentially the tubing is supported by an elongated boom 20 of any convenient nature which may be movable vertically and horizontally by means of a conventional hydraulic system (not shown) such that the tubing 12 and housing 13 may be remotely positioned by the operator. The fan 22 is used to create an air flow from the housing 13 through the tubing 12 and the separator unit 21 thus applying a sub-atmospheric pressure within the housing 13 at contact with the ground. When the fan 22 sets up an airflow through the tubing 12 and the separator 21, soil and debris from the ant hill will be entrained in the airflow. The separator 21 is designed to remove substantially all of the dirt and debris from the airflow upstream from the fan 22. To accomplish this, the separator 21 is configured to force the airflow to make an abrupt turn of approximately 180°. As is well known, the heavier debris particles will tend to move at the out side of this abrupt turn and will lose their forward momentum due to the concentration of debris on the outside of the turn and impact of the debris with the walls of the separator 21. An outlet 24 is provided in the separator 21 which allows the accumulated soil and debris to be removed. Downstream in the airflow from the outlet 24 is a filter 26 which is mounted in the separator 21 to remove whatever large debris is not centrifugally separated from the airflow. A pressure relief valve 27 may also be provided in the separator 21 to provide an alternate airflow if the filter 26 becomes clogged. The separator 21 may be connected directly to the intake of the fan 22 or may be connected via a conduit 28 as shown in FIG. 2.

It will be appreciated that if outlet 24 were open to the atmosphere it would provide a path for airflow which would offer less resistance than through tubing 12. Consequently, airflow through the outlet 24 is substantially eliminated by providing a rotary valve 31 across the outlet 24. The rotary valve 31 comprises a cylindrical case 32 which has a longitudinally formed inlet 33 cooperating with outlet 24. A driven shaft 34 utilizes an axial sleeve 35 having a plurality of slots to carry a plurality of radially extending vanes 36 which extend to approximately 1/16 of an inch from the inner surface of the casing 32 and which extend the length of the casing 32. The ends of the casing 32 are closed, thus requiring any air which passes through the valve 31 to pass through the clearance between the vanes 36 and the casing 32. Each adjacent pair of vanes 36 form a trough which rotates about shaft 34 and which receives therein the debris from the separator 21. The shaft 34 can be driven at a predetermined speed to accommodate various rates of flow of the debris through the valve. The casing 32 has a longitudinally formed discharge outlet 37 along the bottom thereof such that debris carried by the troughs can fall out of the valve as the troughs rotate past the discharge outlet 37.

Beneath the discharge outlet 37 is a channel 38 through which debris is passed to a hammermill 39 wherein the debris is pulverized. This pulverization insures that any ants contained in the debris are destroyed. The channel 38 may be of a length sufficient to prevent debris from backing up from the hammermill 39 to the rotary valve 31.

The hammermill 39 typically employs a driven shaft 41 which carries a plurality of pendulum hammers 42 which mesh and unmesh in a well known manner as the shaft 41 rotates. The pulverized debris passes through a discharge outlet 43 into a housing 44 through which the output of fan 22 is directed such that the debris is blown outward through an exit port 46.

The entire assembly is mounted on a frame 47 which may be attached to a tractor by means of a three point hitch 48. A main drive shaft 49 is mounted in the frame 47 for connection to the power take-off unit 51 of a tractor or like vehicle. A set of drive belts 52 connect the main drive shaft 49 to a secondary drive shaft 53 which in turn is connected by a plurality of belts 61–63 to fan 22, shaft 41, and the input shaft of a gearbox 54 through which shaft 34 is driven. Secondary drive shaft 53 may also power a hydraulic pump 56 which is used to drive hydraulic motor 17a via line 57 when a source of hydraulic power is not available from the tractor. It may also be necessary to power the movement of boom 20 from this hydraulic pump 56 when no hydraulics are available from the tractor. In such instances, control lines may be run from the pump 56 to the tractor to facilitate remote operation of the hydraulic system as is well known.

In operation, my apparatus is connected to a tractor via the three point hitch 48 and transported to an area of fire ant infestation. The housing 13 is positioned over a substantial portion of one of the fire ant hills or mounds to confine the portion of the mound to be removed and the fan 22 is driven via the power take-off (PTO) unit of the tractor to create an airflow from adjacent the housing 13. With the PTO unit delivering 540 RPM, the fan 22 operates at a speed of 3500 to 4000 RPM creating a 10" SP vacuum with an airflow of 2700 CFM. This airflow is set up through the flexible tubing 12 which is ten to twelve feet in length. In areas where the mounds are substantially clear of vegetation, the disrupter unit 14 is not needed, however the disrupter unit 14 may be employed to facilitate entraining the mound and its contents into the airflow by agitating the mound and underlying soil adjacent the surface of the earth. The debris from the mound is carried into the separator unit 21 where it is centrifugally separated from the airflow as shown in FIG. 3 wherein the larger arrows represent the airflow and the debris composed of the mound and its contents are shown entering the rotary valve 31. The rotary valve 31 rotates clockwise at about sixty RPM to provide a controlled rate of entry of the debris into the hammermill 39. Since all of the rotating components are driven from the secondary drive shaft 53, the speed of the rotary valve 31 is proportional to the speed of the fan 22 and is determined by the size of the pulleys carrying belt 63 and by the gear ratio of gearbox 54. While the speeds presented are exemplary, it is to be understood that the rotary valve 31 should rotate sufficiently rapidly to prevent an excess buildup of debris in the separator 21 and at a rate slow enough to prevent overloading the hammermill 39. The hammermill 39 rotates at approximately the same RPM as the fan 22 and serves to pulverize the debris from the mound to assure that any ants passing through the hammermill 39 are destroyed or severely injured. The pulverized debris is recombined with the airflow discharged by fan 22 beneath the hammermill 39 and dispersed through exit port 46.

It is to be understood that it is not necessary to process vast quantities of soil or mound material in order for this apparatus to be effective. Typically, less than five gallons of soil per mound are processed, and a quantity of two to three gallons of soil is considered to be normal. The processing of this amount of soil can be accomplished in approximately 30 seconds from the time the housing 13 is positioned on the mound, thus the ants are unable to react swiftly enough to remove the target of extermination, the queen, to a place of safety. The queen is normally found at some level in the mound above ground level or within two to three inches below ground level, therefore the queen will normally be entrained in the airflow and destroyed. It may thus be seen that the reproductive cycle of the fire ant may be broken and the spread of the pest controlled, without resort to toxic chemicals and without a considerable expenditure of manpower. Furthermore, my apparatus enables the tractor operator to destroy fire ants without dismounting from the tractor, thus with very little danger of being bitten by the ants.

While I have shown my invention in two forms, it will be obvious to those skilled in the art that it is not so limited, but is susceptible of various other changes and modifications without departing from the spirit thereof.

What I claim is:

1. Apparatus for eradicating mounding fire ants in situ comprising:
    (a) means for confining a substantial portion of a fire ant mound for removal thereof;
    (b) means for applying sub-atmospheric pressure to said means for confining such that a portion of said mound and the contents thereof is entrained as debris in an enclosed airflow toward said means for applying sub-atmospheric pressure;
    (c) means cooperatively positioned between said means for confining and said means for applying for substantially separating said debris from said airflow;
    (d) means for pulverizing said debris after said debris is separated from said airflow; and
    (e) means positioned within said means for confining for disrupting said mound and the adjacent soil.

2. Apparatus as defined in claim 1 further comprising screen means mounted within said housing between said disrupter means and said second end for preventing entry into said conduit of material having cross sectional area in excess of a predetermined size.

3. Apparatus as defined in claim 1 wherein said means for pulverizing comprises a hammermill.

4. Apparatus for eradicating mounding fire ants in situ comprising:
    (a) means for confining a substantial portion of a fire ant mound for removal thereof;
    (b) means for applying sub-atmospheric pressure to said means for confining such that a portion of said mound and the contents thereof is entrained as debris in an enclosed airflow toward said means for applying sub-atmospheric pressure;
    (c) means for substantially separating said debris from said airflow including a plenum having an inlet from said means for confining and an outlet to said means for applying sub-atmospheric pressure within said plenum forming a centrifugal separator and having a discharge opening for said debris and a driven rotary valve cooperatively positioned between said descharge opening and said means for pulverizing said debris; and
    (d) means for pulverizing said debris after said debris is separated from said airflow.

5. Apparatus as defined in claim 4 further comprising a filter cooperatively positioned in said airflow from said plenum to said means for applying sub-atmospheric pressure.

6. Apparatus as defined in claim 4 wherein said means for pulverizing comprises a hammermill.

7. Apparatus as defined in claim wherein said rotary valve comprises:
    (a) a cylindrical valve housing having a longitudinal inlet port cooperatively connected to said discharge opening and an outlet port cooperatively connected to said hammermill;
    (b) a driven shaft mounted axially of said housing; and
    (c) a plurality of vanes extending radially from said shaft to within a predetermined distance of said cylindrical housing such that airflow through said valve is substantially impeded at all times.

8. Apparatus as defined in claim 6 wherein said rotary valve comprises:
    (a) a cylindrical valve housing having a longitudinal inlet port cooperatively connected to said discharge opening and an outlet port cooperatively connected to said means for pulverizing;
    (b) a driven shaft mounted axially of said housing; and
    (c) a plurality of vanes extending radially from said shaft to within a predetermined distance of said cylindrical housing such that airflow through said valve is substantially impeded at all times.

9. Apparatus as defined in claim 4 wherein said means for applying sub-atmospheric pressure is a fan operatively connected to said plenum outlet and having a means for discharging air proximal said means for pulverizing to disperse said debris.

* * * * *